F. D. PAYN.
Weighing-Scale.

No. 213,062. Patented Mar. 11, 1879.

WITNESSES
E. H. Bates
Villette Anderson

INVENTOR
Frank D. Payn.
Eugene H. Johnson,
Atty.

UNITED STATES PATENT OFFICE.

FRANK D. PAYN, OF ALBANY, NEW YORK.

IMPROVEMENT IN WEIGHING-SCALES.

Specification forming part of Letters Patent No. 213,062, dated March 11, 1879; application filed September 5, 1878.

*To all whom it may concern:*

Be it known that I, FRANK D. PAYN, of Albany, in the county of Albany and State of New York, have invented a new and valuable Improvement in Weighing-Scales; and I do hereby declare that the following is a full, clear, and exact description of the operation and construction of the same, reference being had to the annexed drawings, making a part of this specification, and to the letters and figures of reference marked thereon.

Figure 1:
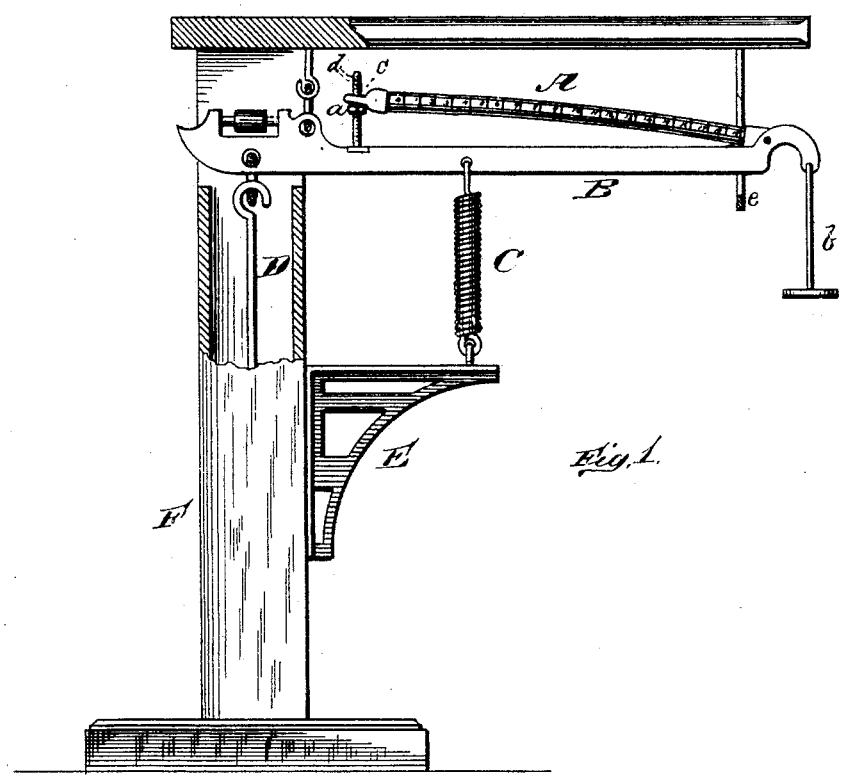
Figure 2:
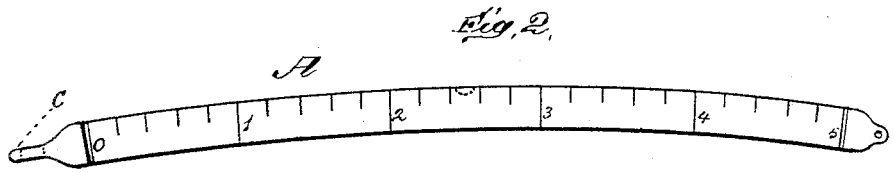

Figure 1 of the drawings is a sectional side view. Fig. 2 is a detail view.

This invention relates to certain new and useful improvements in weighing-scales, as will be hereinafter fully set forth, and pointed out in the claims.

The object of my invention is to dispense with the graduations on the scale-beam and movable weight, and provide a means of indicating the weight of an article placed upon the platform of a weighing-scale automatically.

I have illustrated and will describe my invention in connection with an ordinary platform weighing-scale. Though my invention may be applied to many different forms of scales, it is more easily adapted to that class of balance-scales which are provided with pivoted beams.

On the accompanying drawings, B is the beam of an ordinary platform-scale, which is attached, in the usual manner, by suitable couplings and bearings to the standard F, and from thence, by the rod D, to the platform. The beam B is provided at its end with a weight-receiver, *b*. These elements in a weighing-scale are all old, and I lay no claim to such invention.

My invention consists in combining with the foregoing parts, or their equivalents, in a weighing-scale a graduated transparent curved tube, A, which is partially filled with fluid, and contains an air space or bubble. This is attached over or upon the beam B, and is pivoted at one end to the beam. The other end is adjustably secured to the beam by means of the eye *c* in the tube A, and the nut *a*, and screw-threaded rod *d*, which is attached to the beam. The tube A is vertically adjustable, for the purpose of correcting the effect of any unevenness which might occur either in the base of the scales or the floor upon which they are placed. The graduations on the tube A are preferably on its upper part or sides, and I do not confine myself to any particular method of graduations; but in all cases the tube should be graduated so as to have 0 at or near the adjustable end of the tube. The curve in the tube A is preferably the segment of a circle, so that no two points of its upper portion will lie in the same plane. The air-bubble contained therein will always be found to be at the highest part of this tube, and when the beam rests on the beam-rack *e*, or when there is no weight upon the platform, the air-bubble should be at 0.

My invention also consists in providing the beam to which the tube A is attached with a suitable retracting or retarding spring, C. On the accompanying drawings I have represented this to be a spiral spring, one end of which is attached to a bracket, E, on the standard F, and the other end to the beam A. This spring C takes the place of the sliding weight, the spring retarding the upward movement of the beam in proportion to the amount of weight on the platform; and if the article to be weighed should be beyond the retarding power of the spring, it will be necessary to place weights upon the weight-holder *b* at the end of the beam B, and the equivalent of the weight placed on the weight-receiver must be added to the amount indicated by the air-bubble in the tube A. The retracting power of this spring should be regulated so as to act upon the beam B, and allow it to assume an angle at which the air-bubble in the tube A will indicate the amount of weight on the platform. This is best found by experiments.

The operation of my invention is as follows: When the article to be weighed is placed upon the platform, the beam B changes from its horizontal position to an angular position, the end farthest from the pivoted part of the beam moving through the greatest space, the air-bubble stopping at the highest point, and the graduation at that place on the tube A indicates the weight upon the platform.

What I claim as new, and desire to secure by Letters Patent, is—

1. In a weighing-scale, the combination of the pivoted beam, adapted to receive weights at the outer end thereof, with the curved graduated transparent fluid-tube, having an air-bubble therein, substantially as described, and for the purpose set forth.

2. In a weighing-scale, the combination of the tube A, beam B, and spring C, substantially as described, and for the purpose set forth.

3. In a weighing-scale, the graduated tube A, pivoted near one end of the beam B, and vertically adjustable near the other end thereof, substantially as shown, and for the purpose set forth.

FRANK D. PAYN.

Witnesses:
   THEO. MUNGEN,
   EUGENE W. JOHNSON.